United States Patent [19]

Bartelt et al.

[11] Patent Number: 5,145,188
[45] Date of Patent: Sep. 8, 1992

[54] TOOTHED-BELT DRIVE

[75] Inventors: Dietrich Bartelt, Garbsen, Fed. Rep. of Germany; Valery Guskov; Gennadiy Kozachevskiy, both of Minsk, U.S.S.R.; Janusz Rak, Byolgoszcz/Polen, Poland; Walter Schneck, Stuhr, Fed. Rep. of Germany

[73] Assignee: Wilhelm Herm. Muller GmbH & Co. KG, Hanover, Fed. Rep. of Germany

[21] Appl. No.: 697,993

[22] Filed: May 10, 1991

[30] Foreign Application Priority Data

May 25, 1990 [DE] Fed. Rep. of Germany ....... 4016174

[51] Int. Cl.⁵ ............................................. F16H 7/02
[52] U.S. Cl. .................................................. 474/153
[58] Field of Search ............... 474/152, 153, 154, 204, 474/205

[56] References Cited

U.S. PATENT DOCUMENTS

| | | | |
|---|---|---|---|
| 4,037,485 | 7/1977 | Hoback | 474/153 X |
| 4,403,979 | 9/1983 | Wujick | 474/153 |
| 5,026,327 | 6/1991 | White, Jr. et al. | 474/153 X |

Primary Examiner—Thuy M. Bui
Attorney, Agent, or Firm—Longacre & White

[57] ABSTRACT

The invention concerns a toothed-belt drive consisting of a toothed belt and a spur-gear meshing with its teeth, the transmission of force between belt and spur-gear taking place by the abutting faces of the teeth of the particular part of the belt drive, and is designed in such a way that the substantial shearing and abrading forces occurring at high force transmissions can be absorbed without premature damage to the toothed belt.

10 Claims, 2 Drawing Sheets

TOOTHED-BELT DRIVE

BACKGROUND OF THE INVENTION

1. Field of the Invention

This invention concerns a toothed-belt drive comprised of a toothed belt and a spur-gear meshing with the teeth of the belt. The force transmission between the belt and spur-gear takes place along the abutting faces of the teeth of the particular belt-drive part.

2. Description of the Prior Art

In a known toothed-belt drive of this kind, the force is ordinarily transmitted by means of flat or convex faces on the teeth of the toothed belt or the spur-gear. These faces can transmit only a limited force due to height limitations of the face of the teeth in relation to the design. The forces to be transmitted can only be increased to a minimal degree due to the limited surface area or size of the tooth's surface in light of the shearing and abrading forces exerted on the belt teeth. Toothed belt teeth are sometimes provided with small notches on the top surface of the teeth equal to about 10% of the tooth height. However, these small notches are not for the purpose of transmitting additionally larger forces, but instead serve to decrease the noise level during the operation of the toothed belt and to improve the meshing of the belt teeth with those of the spur-gear. Because of the small notch size, the notches do not allow force transmission.

SUMMARY OF THE INVENTION

It is the object of the invention to design a long lasting toothed belt drive that can absorb higher shearing and abrasive forces resulting from substantial force transmissions between a belt and the tooth without premature damage to the toothed belt. This is accomplished by having a toothed belt and spur gear interface such that the teeth of the toothed belt are each comprised of a recess including at least one notch dividing each recess into two portions. All interfacing surfaces of the toothed belt and the spur gear are curved.

In the invention, the belt teeth are each provided with a conically tapered recess which starts at the top surface of the tooth with curvature of the mutually opposite walls of the recesses corresponding to the curvature of the outer faces of the belt teeth and the recess depth being such so as to allow using the recess inner walls as the force-transmitting faces. These recesses are each engaged with a correspondingly designed projection of the spur-gear present between two spur-gear teeth.

By means of this design, both the shearing and abrasive forces are dispersed and the transmission forces are accordingly able to be substantially increased because they are transmitted not by one, but by two faces of the same tooth, the second face being formed by part of the recess wall.

The force transmission by the teeth of the toothed belt herein takes place over the entire tooth width just as in the conventional case, uniformly extending the force transmitting stresses across the width of the teeth.

The depth of the recess should be at least 50% of the height of the toothed belt, so as to assure effective force transmission.

In a preferred embodiment, the recess forms a comparatively large abutting surface of the faces of the belt teeth and the spur-gear. Consequently, the shearing and abrasive surface at the base of the teeth of the belt is retained, whereby the transmitted forces and the life of the toothed belt can be optimized.

If the recess are larger than the gaps between the individual teeth, then the tooth cross-section at the bottom of the tooth would be substantially degraded. Consequently, in yet another preferred embodiment, the recess should be about 70% to the tooth height. The increased surface area of the toothed belt drive increases the area upon which force can be transmitted and in turn reduces the polygonal effect on force transmission.

In the preferred embodiment, the head of the belt teeth shall rest at the bottom of the tooth gaps between two spur-gear teeth in order to reduce the so-called "polygon effect".

In another preferred embodiment, the projection of the spur-gear entirely fills the recess during meshing.

Additionally, the tooth width should be comparable to the pitch.

DESCRIPTION OF THE PREFERRED EMBODIMENTS

Figure 1:
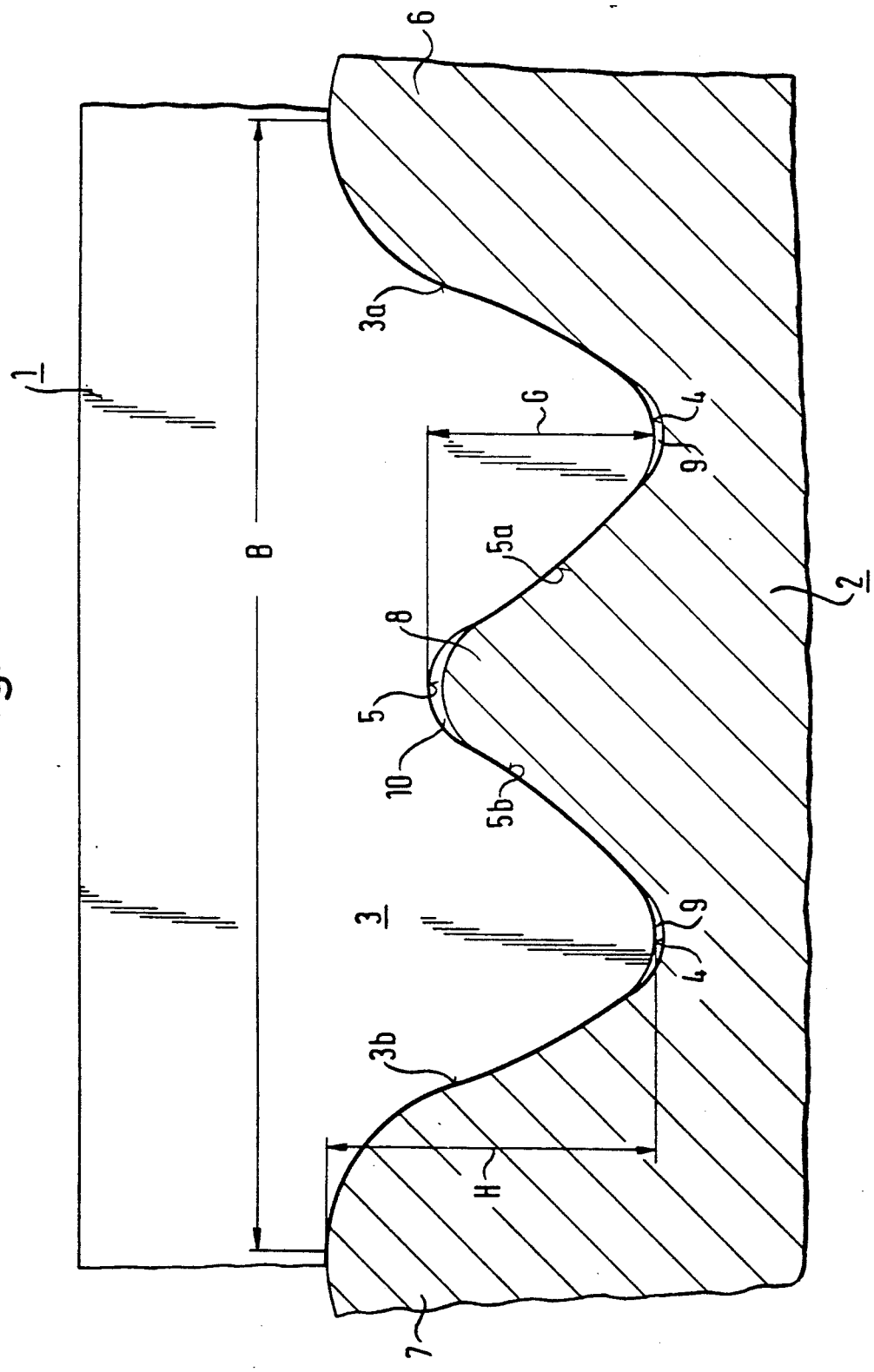
FIG. 1 is a sectional side view of an embodiment of the invention..

FIG. 1 in this case shows a single belt tooth 3 with a length denoted by B, with a recess 5 having a depth G. The belt tooth 3 comprises an approximately conically tapering recess 5 starting at its tip surface 4 and of which the walls 5a and 5b evince a curvature corresponding to that of the external faces 3a and 3b of the belt tooth 3. The size of the recess 5 is such as to make it possible for the inner walls 5a and 5b of the recess 5 to act as force-transmitting faces. In the preferred embodiment of this invention, the recesses 5 of the teeth 3 have a depth G equal to at least approximately one-half the height of the belt tooth 3. The recess in the tooth creates two notches on the tooth 3. In a preferred embodiment, the notches have a height H equal to approximately 70% of the height of the tooth.

A matchingly shaped projection 8 present between two spur-gear teeth 6 and 7 from the spur-gear 2 enters the recess 5, whereby an additional force transmission is created between tooth 3 of the toothed belt 1 and the teeth 6 and 7 of the spur-gear 2.

In the embodiment shown in FIG. 1, a space 9 is present between remaining tip surfaces 4 of the toothed belt 3 and the bottom of opposite gap between the two spur-gear teeth 6 and 7, whereby no contact takes place in this zone between the toothed belt and the spur-gear. However, in a different embodiment of the invention, the tip of the belt tooth 3 rests on the bottom of the tooth gap between the two spur-gear teeth 6 and 7 so as to reduce the so-called polygon effect. Similar considerations apply to a space 10 between the end of the projection 8 facing the toothed belt and the end of the recess 5. In some instances, the projection 8 of the spur-gear 2 may entirely fill the recess 5 when in the engaged condition.

Figure 2:
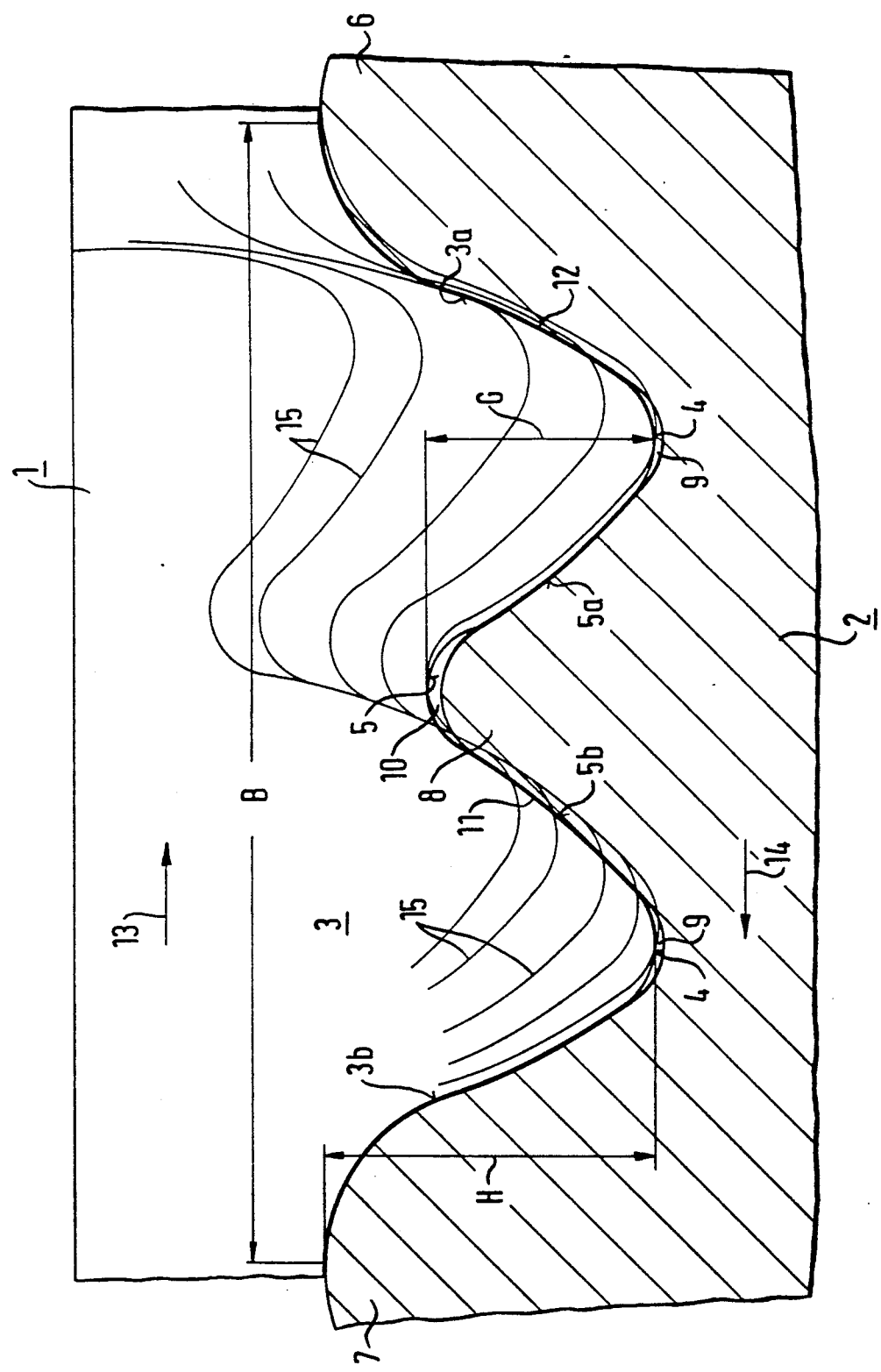
FIG. 2 is a schematic illustration of the force transmission of the invention.

The forces which can be transmitted are substantially increased in the design shown because these forces no longer are transmitted by a single tooth face but by two (see FIG. 2). In view of the comparatively large length B of the belt tooth, the shearing and abrasive forces are spread over a relatively large surface, so that the life of the toothed belt will not be degraded in spite of the higher force transmission.

Such conditions are clarified schematically by the arrows 13 and 14 in FIG. 2 showing the mutually opposite transmission forces between the belt teeth 1 and the spur-gear 2. With G showing the depth of the recess 5 and H showing the height of the notches of the tooth 3, the transmission forces are shown by stress lines 15 in FIG. 2, where both the face II of the projection 8 and the face 12 of the next spur-gear tooth 6 simultaneously are loaded by the forces being transmitted. As these force transmissions are spread over at least two faces or areas of interfacing, there is a much greater surface area for forces to be transmitted, thereby making possible a much higher force transmission. With a greater surface area and with interfacing surfaces that are curved instead of flat or polygonal, there is a markedly reduced polygonal effect on the force transmission.

Although particular embodiments of the present invention have been described and illustrated herein, it should be recognized that modifications and variations may readily occur to those skilled in the art and that such modifications and variations may be made without departing from the spirit and scope of the invention. Consequently, the invention as claimed below may be practiced otherwise than as specifically described below.

What is claimed is:

1. A toothed-belt drive combination comprising:
   a toothed-belt including a plurality of belt teeth extending from said toothed-belt, each of said belt teeth having a pair of external faces such that adjacent external faces on successive belt teeth from a notch between said successive belt teeth, each of said belt teeth further having a pair of internal walls such that said pair of internal walls form a recess in each of said belt teeth, each said notch is deeper than each said recess; and
   a spur-gear including a plurality of spur-gear teeth and a plurality of spur gear projections, said spur-gear projections and said spur-gear teeth are arranged to alternately extend radially outward from said spur-gear such that each of said spur-gear projections is interposed between successive spur-gear teeth and each of said spur-gear teeth is interposed between successive spur-gear projections, each said spur-gear teeth extends further from said spur-gear than said spur-gear projections;
   whereby said belt teeth, notches and recesses on said toothed belt are adapted to approximately complement and engage said spur-gear projections and spur-gear teeth on said spur-gear.

2. The toothed-belt drive combination according to claim 1, wherein said external faces, said inner walls and said recesses of said belt teeth of said toothed-belt and said approximately complementary spur-gear teeth and spur-gear projections of said spur-gear are smooth continuous curves.

3. The toothed-belt drive combination according to claim 2, wherein said recesses of said belt teeth are of sufficient depth so that said inner walls are adapted for force transmitting.

4. The toothed-belt drive combination according to claim 2, characterized in that each of the notches has a depth which is equal to approximately 70% of said belt teeth height.

5. The toothed-belt drive combination according to claim 1, wherein each of said recesses of said belt teeth have a depth which is at least one-half of said belt teeth height.

6. The toothed-belt drive combination according to claim 1, wherein said belt teeth have tops adapted to be received in gaps between said spur-gear teeth and spur-gear projections.

7. The toothed-belt drive combination according to claim 1, wherein said spur-gear projections when engaged with said toothed-belt entirely fills said recesses.

8. The toothed-belt drive combination according to claim 1, wherein said spur-gear projection when engaged with said toothed-belt is in complete contact with the inner walls of said recess.

9. The toothed-belt drive combination according to claim 1, wherein each of said belt teeth have width which is greater than its pitch.

10. The toothed-belt drive combination according to claim 1, wherein a space exists between said spur-gear projection and said recess when said spur-gear is engaged with said toothed-belt.

* * * * *